A. CHURCHWARD.
POWER TRANSMISSION.
APPLICATION FILED JULY 20, 1917.

1,287,883. Patented Dec. 17, 1918.

Inventor:
Alexander Churchward
By Henry J. Miller
atty.

UNITED STATES PATENT OFFICE.

ALEXANDER CHURCHWARD, OF BOSTON, MASSACHUSETTS, ASSIGNOR TO A. B. C. STARTER COMPANY, A CORPORATION OF MICHIGAN.

POWER TRANSMISSION.

1,287,883.  Specification of Letters Patent.  Patented Dec. 17, 1918.

Application filed July 20, 1917. Serial No. 181,868.

*To all whom it may concern:*

Be it known that I, ALEXANDER CHURCHWARD, a citizen of the United States, and a resident of Boston, county of Suffolk, State of Massachusetts, have invented new and useful Improvements in Power Transmission, of which the following is a specification, reference being had to the accompanying drawings, forming part thereof.

This invention consists in an improved apparatus for transmitting power from a motor to an engine to effect compression of gas and particularly to such apparatus adapted to transmit power from an electric motor through a clutch of some kind to the crank shaft of a combustion engine.

One object of the invention is to provide a power transmitting apparatus in which shock to and from the engine or crank shaft is absorbed whereby reaction of said shock on the crank shaft is reduced and shock to the electric motor is largely eliminated.

Another object of the invention is to provide a power transmitting apparatus, having speed reducing gears between an electric motor and a transmission element, in which a governed or controlled shock absorber is applied to reduce the effect of a sudden reaction of said element on a comparatively large gear in mesh with a comparatively small gear.

Other objects of the invention will appear from the following description.

The invention consists in the novel shock absorber.

The invention also consists in the resisting of shock to the larger gear of a train of gears for transmitting power from an electric motor.

The invention also consists in such other novel features of construction and combination of parts as shall hereinafter be more fully described and pointed out in the claims.

Similar characters of reference designate corresponding parts throughout.

Figure 1:
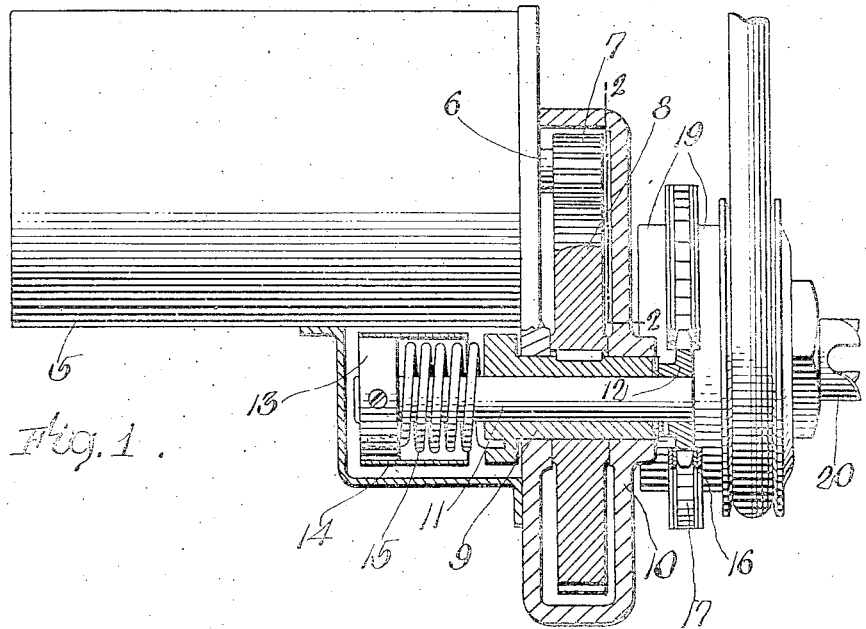
Figure 1, represents a side view of parts of the improved power transmitting apparatus partly in section as on line 1—1 Fig. 2.
Figure 2:
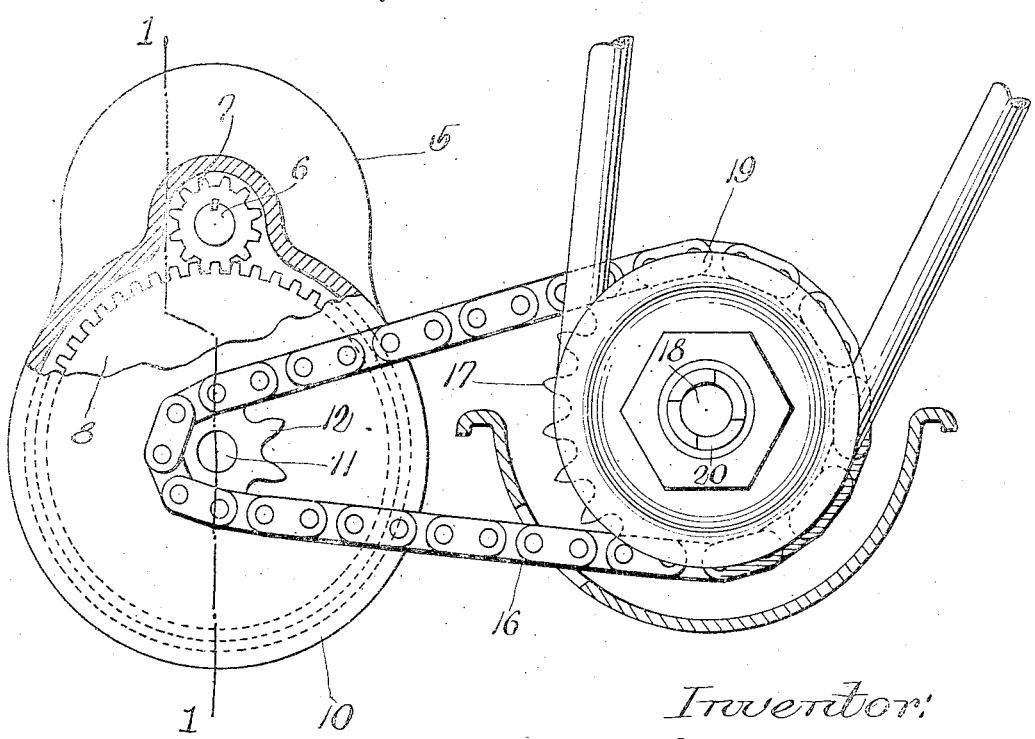
Fig. 2, represents a front elevation of the same some of the parts being shown in section as on line 2—2 Fig. 1.

As shown in the drawings 5 represents an electric motor of any well known construction having the shaft 6 furnished with the pinion 7. In mesh with pinion 7 is the speed reducing gear 8 larger than pinion 7 and keyed to the sleeve 9 which latter is rotatable in bearings of the gear case 10. Journaled in the bore of sleeve 9 is the shaft 11 which is furnished at one end with the sprocket or drive member 12 and at the other end with the collar 13 having the casing 14. Collar 13 is connected with sleeve 9 by means of the coil spring 15 of which one end is secured to said collar 13 and the other end to said sleeve 9 in such manner, that when a rotative motion is imparted to said spring by sleeve 9 said spring is wound in a direction which tends to tighten the spring and reduce its general diameter, while if retractive rotative movement is transmitted to said spring through shaft 11 and collar 13 said spring tends to expand; expansion of said spring being limited by casing 14 within which spring 15 is partially contained.

Power is transmitted from shaft 11 through its sprocket or drive member 12 and chain 16 to sprocket 17 which is mounted to rotate on the shaft 18 and has a clutch connection indicated at 19 of any well known construction adapted to effect suitable driving conection between said sprocket 17 and said shaft 18, and preferably to be automatically released when the engine attains speed.

Shaft 18 may be the crank shaft of a combustion engine to which it is desired at times to impart rotation by transmission of power from motor shaft 6 through the speed reducing gears 7, 8 and 12, 16. In some cases however it is desirable to effect an initial rotation of shaft 18 by means of a manually operated crank and for this purpose said engine shaft 18 is furnished with the member 20 of a well known construction usually applied to the shafts of combustion engines and adapted to be engaged by a complementary member of a crank.

When motor shaft 6 is rotated power is transmitted by its pinion 7 to gear 8 and this gear 8 is rotated at a speed relatively slower to that of pinion 6. The initial rotative action of gear 8, and its sleeve 9, is resisted somewhat by coil spring 15 which yields somewhat until its resistance overcomes the inertia of collar 13, shaft 11 and the parts driven by said shaft through the speed reducing gears (sprockets) 12 and 17 so that sprocket 17 and the parts operated thereby are caused to rotate without being subjected to shock.

If sprocket 17 is given a reverse rotation the relative size of the sprockets and gears would act to increase their speed of rotation until shaft 6 might be subjected to a sudden rotative strain and speed many times the strain and speed exerted on sprocket 17. Such sudden strain is however resisted by spring 15 which, in the rotative action exerted on it by the shaft 11 and collar 13, tends to expand and also to cushion or absorb the shock or strain of said reverse action whereby said shock or strain may be wholly dissipated without action on gear 8 or with a greatly reduced action thereon. The expansion of said spring 15 is ultimately resisted by the casing 14 the diameter of which may depend somewhat on the diameter and flexibility of said spring 15. Thus the casing 14 and spring 15 constitute a governed shock absorbing device.

Having thus described my invention I claim as new and desire to secure by Letters Patent.

1. Power transmission means of the nature described comprising a motor shaft, an engine shaft, a pinion on said motor shaft, a rotatable gear driven by said pinion having a tubular shaft member, and means to transmit power from said shaft member to said engine shaft including a shaft rotatable in said shaft member and a yielding connection.

2. Power transmission means of the nature described comprising a motor shaft, an engine shaft, a pinion on said motor shaft, a rotatable gear driven by said pinion having a tubular shaft member, and means to transmit power from said shaft member to said engine shaft including a shaft rotatable in said shaft member and a yielding connection comprising a coil spring and means to connect the same respectively with said shaft member and said shaft.

3. Power transmission means of the nature described comprising a motor shaft, an engine shaft, a pinion on said motor shaft, a gear of larger diameter than said pinion driven thereby and having a rotatable tubular shaft member, a shaft journaled in said shaft member, a coil spring to transmit power to or from said shaft member and shaft, means to restrict action of said spring, and means to transmit power from said shaft to said engine shaft including a clutch.

ALEXANDER CHURCHWARD.